(12) United States Patent
Konishi et al.

(10) Patent No.: US 6,875,141 B2
(45) Date of Patent: Apr. 5, 2005

(54) RATCHET-TYPE HYDRAULIC TENSIONER

(75) Inventors: Tatsuya Konishi, Osaka (JP); Toyonaga Saitoh, Osaka (JP); Yoshio Kurokawa, Osaka (JP); Tsutomu Namie, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 76 days.

(21) Appl. No.: 10/388,004

(22) Filed: Mar. 13, 2003

(65) Prior Publication Data

US 2003/0186765 A1 Oct. 2, 2003

(30) Foreign Application Priority Data

Mar. 27, 2002 (JP) .......................... 2002-088020

(51) Int. Cl.[7] .............................................. F16H 7/22
(52) U.S. Cl. ...................................... 474/109; 474/101
(58) Field of Search .............................. 474/101, 109, 474/110, 111, 113, 114, 115, 116, 136

(56) References Cited

U.S. PATENT DOCUMENTS

| | | | |
|---|---|---|---|
| 4,822,320 A | * | 4/1989 | Suzuki ....................... 474/111 |
| 5,090,946 A | * | 2/1992 | Futami et al. ............... 474/104 |
| 5,277,664 A | | 1/1994 | Mott |
| 5,441,457 A | * | 8/1995 | Tsutsumi et al. ............ 474/110 |
| 5,954,159 A | * | 9/1999 | Nakamura .................. 184/11.2 |
| 6,213,073 B1 | * | 4/2001 | Iwata ........................ 123/90.38 |

FOREIGN PATENT DOCUMENTS

JP    2001-208150    8/2001

* cited by examiner

*Primary Examiner*—David A. Bucci
*Assistant Examiner*—Vicky A. Johnson
(74) *Attorney, Agent, or Firm*—Howson and Howson (57) ABSTRACT

In a ratchet-type hydraulic tensioner for use with a timing chain of an internal combustion engine, two or more oil reservoirs gradually receive oil fed under pressure from an external source, and supply the oil through a hydraulic valve mechanism to a high pressure oil chamber formed by a plunger and a housing in which the plunger is slidable. Throttle holes, formed in partition walls separating the reservoirs, control the flow of oil from one reservoir to another. An excess oil discharge hole is optionally provided in one of the reservoirs. The invention prevents abnormal protrusion of the plunger, reduces chain noise and component damage due to wear, and rapidly re-establishes proper tension on engine start-up.

2 Claims, 6 Drawing Sheets

RATCHET-TYPE HYDRAULIC TENSIONER

FIELD OF THE INVENTION

This invention relates to a tensioner used for imparting proper tension to a timing chain, a timing belt, or the like, in a vehicle engine, and more specifically to a ratchet type hydraulic tensioner in which a ratchet locking mechanism and a hydraulic valve mechanism are combined.

BACKGROUND OF THE INVENTION

Tensioners have been widely used to maintain proper tension in, and suppress the vibration of, a timing chain which transmits rotation between a crankshaft sprocket and a camshaft sprocket in an engine. In a typical engine, a tensioner lever is pivotally mounted on the engine. The lever has a shoe which is in sliding contact with the slack side of the timing chain. A tensioner, which cooperates with the lever, has a protruding plunger which presses against the back side of the lever, thereby imparting tension to the chain.

Figure 7:
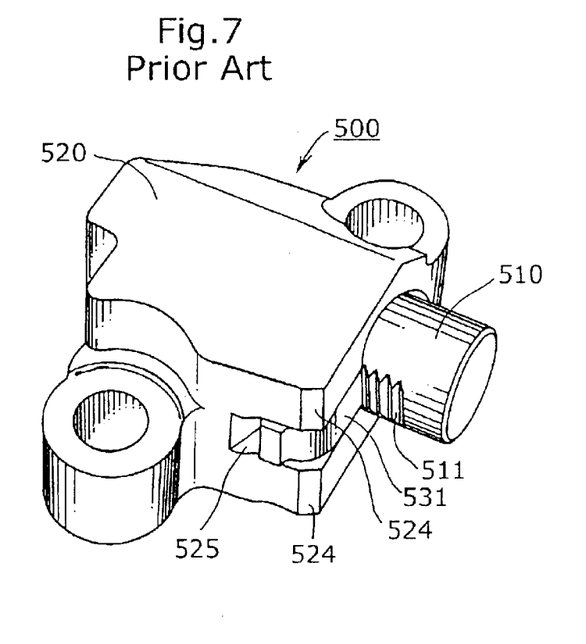
FIG. 7 is an external perspective view of a conventional ratchet-type hydraulic tensioner.
Figure 8:
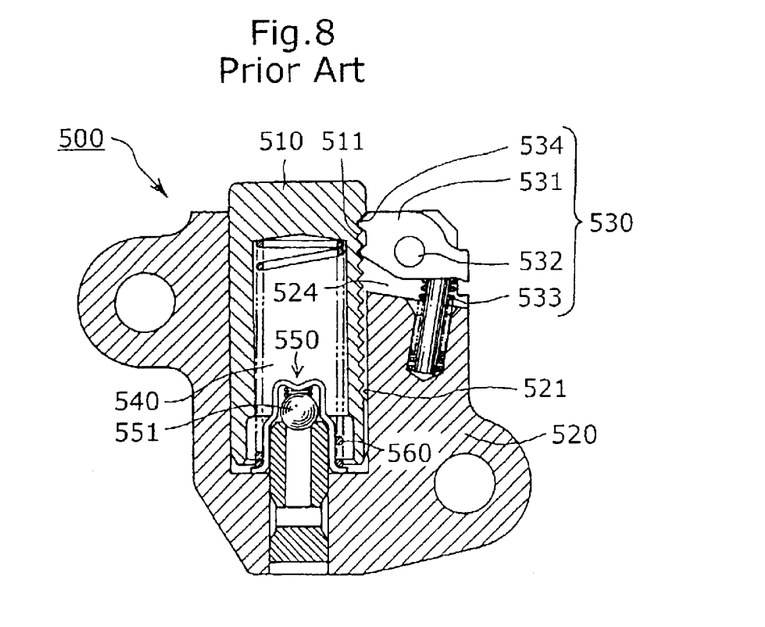
FIG. 8 is a cross-sectional view of the conventional ratchet-type hydraulic tensioner.

FIGS. 7 and 8 show a conventional ratchet-type hydraulic tensioner 500, which includes a ratchet locking mechanism 530. This tensioner is disclosed in the specification of Japanese patent application No. 2000-013068. In the tensioner 500, a plunger 510 protrudes from a housing 520, and is biased in the protruding direction by a spring 560. The end of the plunger is movable forward and backward relative to a front surface of the tensioner. A ratchet pawl 531 is pivotally supported on the housing body 520 in a recessed groove 525 formed between side walls 524 of the housing 520. The pawl is biased by a compression spring 533. Retraction of the plunger 510 is blocked by engagement of the teeth 534 of the pawl with ratchet teeth 511 formed on the outer periphery of the plunger 510 on one side thereof.

The tensioner 500 includes a hydraulic valve mechanism 550 having a check valve 551 incorporating a check ball or the like. Oil is fed under pressure, by an oil pump (not shown) activated by the engine, through the valve mechanism 550, to a high pressure oil chamber 540 inside the plunger 510.

When an impact force is applied to the plunger by the tensioner lever, since the ratchet teeth are engaged with the pawl teeth 534, the plunger 510 retracts against the biasing force applied by the plunger spring 560, through a distance within the range permitted by the amount of backlash between the ratchet teeth 511 and the pawl teeth 534. The initial retracting movement of the plunger causes the hydraulic valve mechanism 550 to close. As the plunger continues to move in the retracting direction while the valve mechanism is closed, oil in the high-pressure oil chamber 540 leaks out between the outer peripheral surface of the plunger 510 and the inner peripheral surface of the plunger-receiving hole 521. Because of the damping effect of this leakage of oil, the plunger absorbs the impact imparted by the tensioner lever.

When rate at which oil is supplied by an oil pump to the tensioner 500 increases rapidly, excessive oil is fed through the hydraulic valve mechanism 550 to the high-pressure oil chamber 540 in the plunger 510. The excessive oil will cause the plunger 510 to protrude toward the tensioner lever farther than necessary.

Excessive protrusion of the plunger may occur, in particular, when a cold engine is started, because the oil supplied by the oil pump is cold and its viscosity is high. Thus, the oil pressure in the high-pressure oil chamber 540 within the plunger 510 is higher than usual, and, as a result the plunger 510, is pushed out toward the tensioner lever farther than necessary.

In the case of a conventional ratchet-type hydraulic tensioner, the ratchet mechanism prevents the plunger from returning to its normal position after it has protruded excessively from the tensioner housing. As a result, the plunger 510 presses on the tensioner lever, which in turn exerts excessive pressure on the timing chain, holding the chain under an abnormally increased tension. The excessive tension in the chain generates a noise, referred to as a "whistling sound", and also causes premature breakage of the chain.

Another problem encountered in the operation of the conventional ratchet-type hydraulic tensioner is that the supply of oil to the tensioner stops simultaneously with the stopping of the engine. The amount of oil in the oil passage leading to the high pressure chamber inside the plunger gradually decreases and the oil in the oil passage becomes mixed with air. The presence of air in the oil passage causes the behavior of the plunger to become unstable when the engine is re-started, and causes a troublesome delay in the reestablishment of appropriate chain tension.

An object of the invention is to solve the above-described problems encountered in the use of conventional tensioners. It is also an object of the invention to provide a ratchet-type hydraulic tensioner in which, when excessive oil is supplied from an external oil pressure source, the excess supply of oil to the plunger is suppressed, and abnormal protrusion of the plunger is prevented, so that the whistling sound is reduced. Still another object is to establish proper chain tension rapidly upon starting of the engine, and to ensure smooth travel of the chain so that damage to components of the tensioner can be significantly reduced.

SUMMARY OF THE INVENTION

The tensioner in accordance with the invention has a number of features in common with a conventional ratchet-type hydraulic tensioner. It comprises a housing having a plunger-receiving hole, and a plunger slidably fitting into the plunger-receiving hole and protruding therefrom. The plunger and the housing together form an oil chamber. A spring-biases the plunger in the protruding direction. The tensioner also includes ratchet locking mechanism, comprising a pawl pivoted on the housing, and ratchet teeth on the plunger engaged by the pawl. A hydraulic valve mechanism, allows oil from an external source to flow under pressure into the oil chamber, but blocks reverse flow of oil out of the oil chamber. The tensioner is distinguished from the conventional tensioner by a plurality of oil reservoirs formed in the housing. The oil reservoirs are arranged in a series of successive reservoirs, and the reservoirs of each successive pair of reservoirs are separated by a partition. At least one throttle hole is formed in each partition for controlling flow of oil from the reservoir on one side thereof to the reservoir on the other side thereof. The series of reservoirs provides a flow path leading from a passage for receiving oil from an external source to the hydraulic valve mechanism. The reservoirs gradually receive oil fed under pressure from an external source and supply the oil to the oil chamber through the hydraulic valve mechanism.

In a preferred embodiment of the invention, a discharge hole is provided, leading from one of the reservoirs to the exterior of the housing, for discharging excess oil.

The oil reservoirs in the invention may take any of various forms, provided that oil fed under pressure from an external oil pressure source is gradually accumulated and can be supplied to the hydraulic valve mechanism. When the reservoirs are provided in the tensioner so that they communicate with oil supply openings in the wall of the engine block, the engine block wall itself can serve as a part of the enclosures of the reservoirs. Therefore, the oil reservoirs can be easily formed in the required shape.

A throttle hole may be used to control the amount of supply oil fed under pressure from an external oil pressure source to the hydraulic valve mechanism. Any number of such holes, any hole diameter, and any hole length can be used. The positions of the throttle hole or holes can be selected in accordance with the shape of the oil reservoirs and the shapes of partition walls separating the reservoirs.

A discharge hole discharges excess oil from the oil reservoirs to the outside of the housing. The discharge hole can also discharge air accumulated in the reservoirs or a mixture of air and oil. The discharge holes may be in any of various diameters, lengths and shapes.

In accordance with the invention, a plurality of oil reservoirs gradually receive oil supplied under pressure from an external oil pressure source and supply the oil to the hydraulic valve mechanism, and a throttle hole is provided in a wall which partitions the oil reservoirs. Accordingly, when excess oil is supplied by an external oil pressure source, the amount of oil supplied to the hydraulic valve mechanism is controlled by the throttle hole, and the supplied oil is gradually accumulated in the oil reservoirs without being fed rapidly under pressure to the high pressure oil chamber.

Furthermore, since a discharge hole is provided in the oil reservoir for discharging excess oil to the outside of the housing, the excessive supply of oil to the high pressure oil chamber is completely avoided.

DETAILED DESCRIPTION OF THE PREFERRED EMBODIMENTS

Preferred embodiments of a ratchet-type hydraulic tensioner according to the invention will now be described with reference to drawings.

Figure 1:
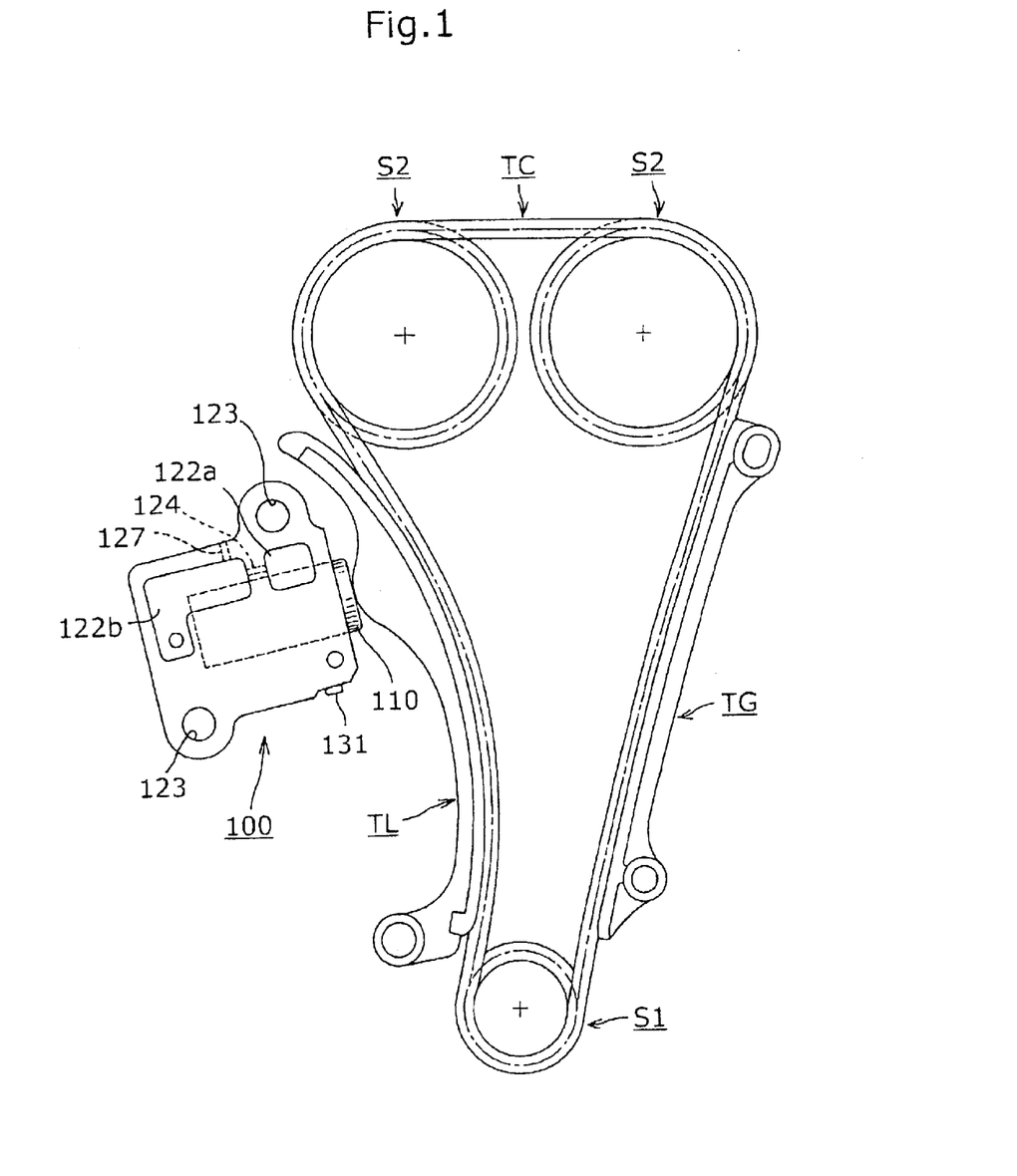
FIG. 1 is an elevational view showing a ratchet-type hydraulic tensioner, in accordance with a first embodiment of the invention, used to control tension in the timing chain of an internal combustion engine.

The ratchet-type hydraulic tensioner 100 in accordance with the first embodiment of the invention, as shown in FIG. 1, maintains proper tension in a timing chain TC, which transmits rotation between a crankshaft sprocket S1 and camshaft sprockets S2, and at the same time suppresses vibration generated by the traveling movement of the chain. In the tensioner 100, a plunger 110 is spring-biased so that it protrudes toward the chain TC, and presses against the back surface of a tensioner lever TL which is pivotally supported on an engine, so that a surface of a shoe on the tensioner lever is held in sliding contact with the slack side of the timing chain TC to impart tension to the timing chain.

Figure 2:
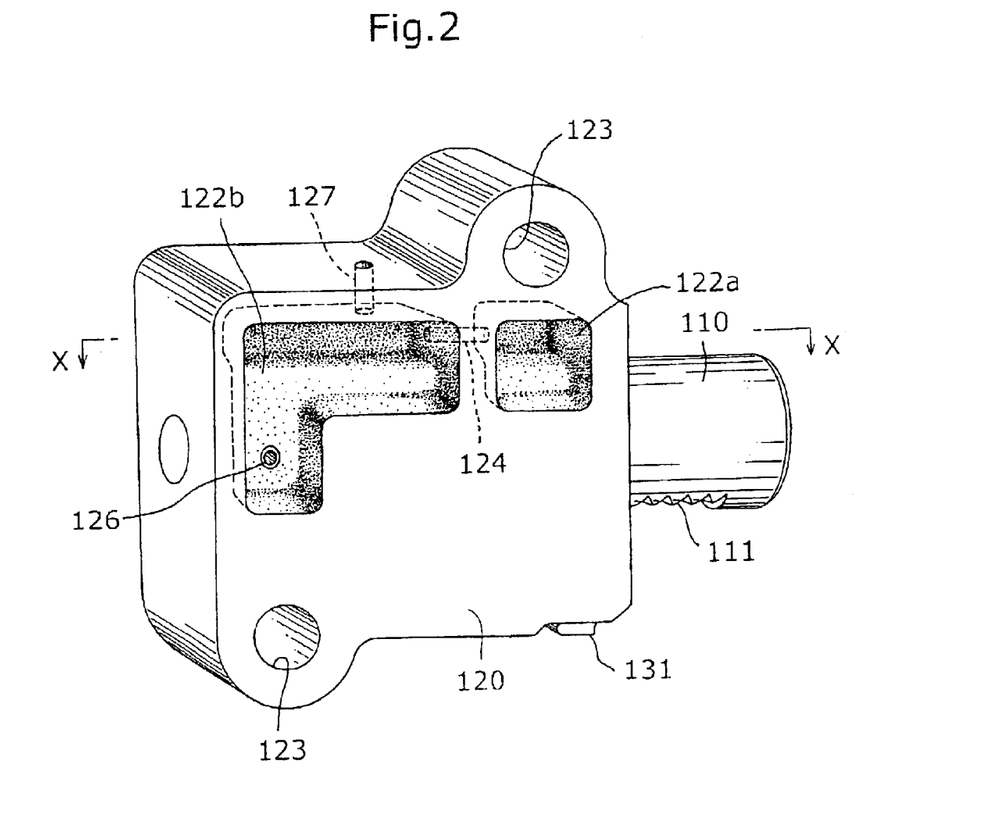
FIG. 2 is an perspective view of the tensioner shown in FIG. 1.
Figure 3:
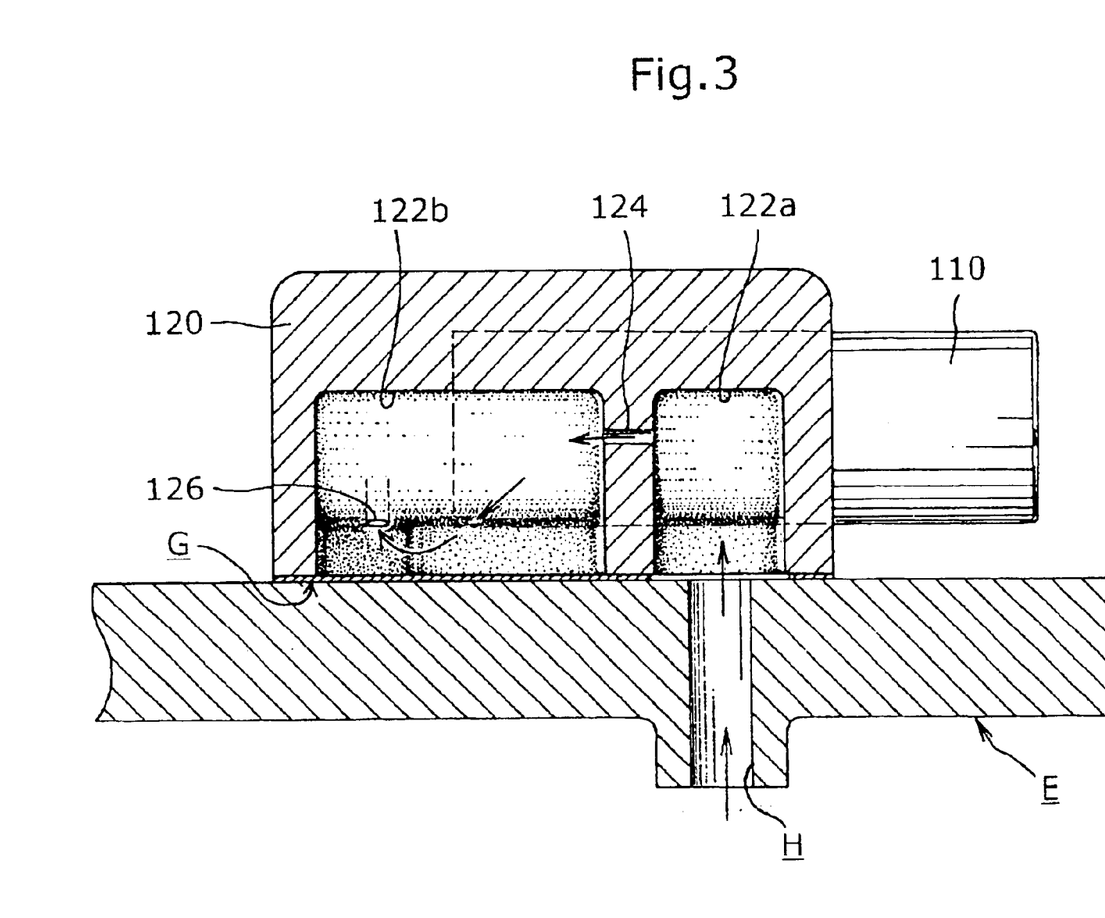
FIG. 3 is cross-sectional view of the tension of FIG. 2, taken on plane X—X in FIG. 2, also illustrating the mounting of the tensioner on an engine.
Figure 4:
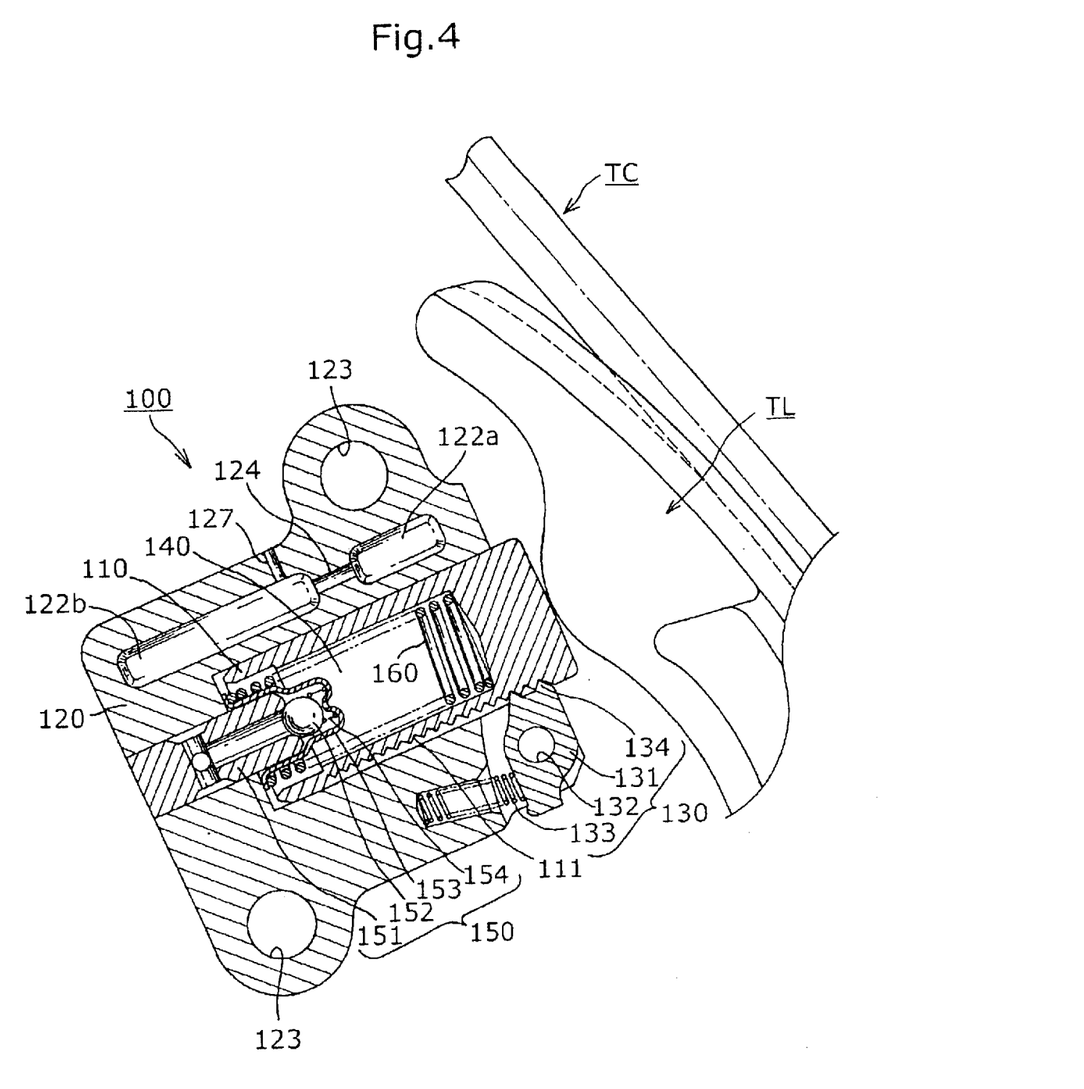
FIG. 4. is a detailed cross-sectional view of the tensioner of FIG. 1, showing the tensioner in cooperation with a tensioner lever.

The tensioner 100, as shown in FIGS. 2–4 includes a housing 120 having a plunger-receiving hole into which the plunger 110 fits slidably, and a pair of oil reservoirs 122a and 122b, which receive a supply of oil fed under pressure from an external oil pressure source such as an oil pump or the like (not shown). As shown in FIG. 4, the housing 120 includes a ratchet locking mechanism 130, in which a ratchet pawl 131, pivotally supported on housing 120 engages with ratchet teeth 111 provided on a side of the outer periphery of the plunger 110. The tensioner also includes a hydraulic valve mechanism 150, which allows oil, supplied from the oil reservoirs 122a and 122b, to flow into a high-pressure oil chamber 140 formed between the plunger-receiving hole and the plunger 110, but blocks reverse flow of oil.

A mounting hole 123 (FIGS. 1, 2 and 4) is provided for securing the tensioner on an engine block wall E (FIG. 3), a gasket G being provided between the tensioner and the engine block. Arrows in FIG. 3 denote the flow of supply oil fed under pressure from an external oil pressure source.

As shown in FIG. 4, the ratchet locking mechanism 130 comprises a pawl 131 pivotally supported on a shaft 132, and biased by a spring 133. Retracting movement of the plunger 110 is blocked by the engagement of teeth 134 on the ratchet pawl 131 with ratchet teeth 111 on the plunger.

The hydraulic valve mechanism 150 comprises a ball seat 151 press-fit into the tensioner housing 120, a check ball 152, which can freely abut the ball seat 151, a retainer 153, which retains the check ball 152, and a spring 154, which biases the check ball 152 toward the seat 151. The valve mechanism 150 allows the flow of oil into a high-pressure oil chamber 140 but blocks reverse flow of oil from the high-pressure oil chamber 140.

As mentioned previously, the tensioner 100 has a backlash between the ratchet teeth 111 and the pawl teeth 134. Oil is introduced from an exterior oil pump (not shown), through an oil supply hole H (FIG. 3) in the engine block wall E, so that the oil is caused to flow into the inside of the plunger 110 via the hydraulic valve mechanism 150.

Thus, when an impact is exerted on the plunger 110 by the tensioner lever TL, the plunger 110 moves in the retracting direction, against the biasing force of the plunger spring 160, through a distance within the range permitted by the amount of backlash between the ratchet teeth 111 and the pawl teeth 134. The initial retracting movement of the plunger causes the hydraulic valve mechanism 150 to close, whereupon, as the plunger continues to move in the retracting direction within the range permitted by the backlash of the ratchet and pawl teeth, oil in the high pressure chamber 140 leaks between the outer peripheral surface of the plunger 110 and the inner peripheral surface of the plunger-receiving hole in the housing 120, exerting a damping effect so that the plunger is able to absorb the impact.

When the timing chain TC becomes extended during operation, the plunger 110 is moved in the protruding direction by spring 160, and oil is supplied from outside. The engagement between the ratchet teeth 111 of the plunger 110 and the pawl teeth 134 is shifted by one tooth and the plunger 110, functioning as a one-way mechanism, follows the timing chain TC.

Two oil reservoirs, a small reservoir 122a and a larger reservoir 122b, are provided in the housing 120 for gradually reserving oil fed under pressure from the external oil pressure source, and supplying the oil to the hydraulic valve mechanism 150. A throttle hole 124, providing fluid communication between the two reservoirs, is provided in a partition wall which separates the oil reservoirs from each other.

As seen in FIG. 3, the engine block wall E, in which the oil supply hole H is formed, is used to enclose the oil reservoirs. Consequently, the reservoirs in the tensioner housing can be formed easily. The supply oil accumulated in oil reservoir 122b is supplied to the high-pressure oil chamber 140 through an oil supply passage 126 (FIGS. 2 and 3) and the hydraulic valve mechanism 150 (FIG. 4).

The throttle hole 124 controls the amount of oil entering the reservoir 122b, thereby suppressing the excessive supply of oil to the high pressure chamber of the tensioner. The controlling effect of the throttle hole is supplemented by an excess supply oil discharge hole 127 provided in the oil reservoir 122b, as shown in FIGS. 2 and 4. This discharge hole discharges excess oil to the outside of the housing 120. Part of the excess oil, supplied to the oil reservoir 122b from an external oil pressure source such as an oil pump or the like through the oil supply hole H (FIG. 3), reservoir 122a, and throttle hole 124, is discharged through the excess supply oil discharge hole 127. Consequently, excessive supply of oil into the high-pressure oil chamber 140 is completely avoided.

In tensioner 100, when excess supply oil is supplied from the external oil pressure source, the oil is supplied to large and small oil reservoirs 122a and 122b respectively. The oil is therefore accumulated gradually without being forced rapidly into the high pressure oil chamber 140 of the tensioner. At the same time, the amount of oil entering the larger reservoir 122b is controlled by the throttle hole 124, and part of the excess supply oil is discharged from the tensioner housing 120 through discharge hole 127. Consequently, the entry of excess oil into the high-pressure oil chamber 140 is avoided.

The tensioner structure shown in FIGS. 1–4 avoids excess oil in the high pressure chamber 140 without the need for attaching other components to the tensioner for controlling the amount of oil supplied to the tensioner housing 120. Abnormal protrusion of the plunger is avoided, the whistling sound is reduced, and proper chain tension is established promptly upon start-up of the engine so that the chain travels smoothly and damage to tensioner components, the tensioner lever TL, and the timing chain TC, due to wear are significantly reduced.

Even if the supply of oil stops at the same time that the engine stops, since oil remains in the small and large oil reservoirs 122a and 122b, air does not become mixed with the oil in the high-pressure oil chamber 140, as it does in the case of a conventional ratchet-type hydraulic tensioner. Therefore proper chain tension can be re-established rapidly upon engine start-up.

Figure 5:
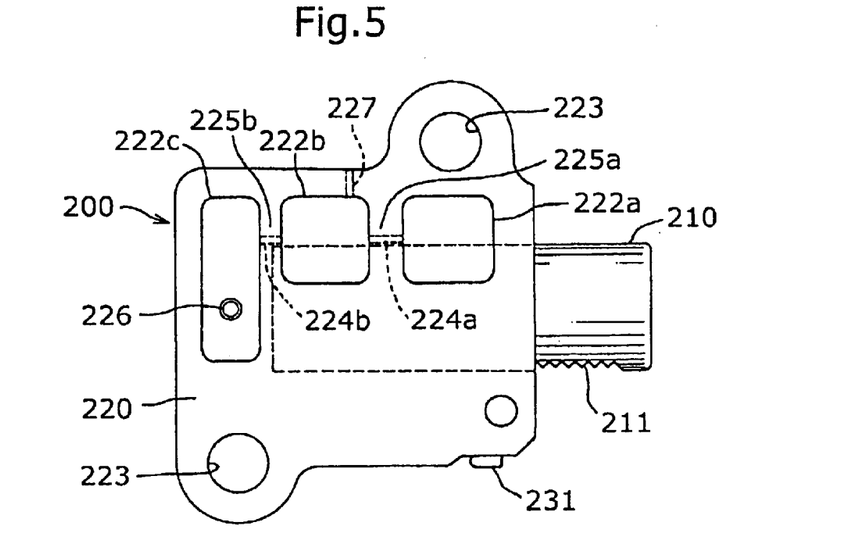
FIG. 5 is a schematic view of a ratchet-type hydraulic tensioner according to a second embodiment of the invention.

In an alternative embodiment shown in FIG. 5, a tensioner 200 includes a retractable plunger 210, slidably fitting into a housing 220, and spring-biased so that it protrudes from the housing toward a traveling timing chain (not shown).

In a ratchet-type hydraulic tensioner for use with a timing chain of an internal combustion engine, two or more oil reservoirs gradually receive oil fed under pressure from an external source, and supply the oil through a hydraulic valve mechanism to a high pressure oil chamber formed by a plunger and a housing in which the plunger is slidable. Throttle holes, formed in partition walls separating the reservoirs, control the flow of oil from one reservoir to another. An excess oil discharge hole is optionally provided in one of the reservoirs. The invention prevents abnormal protrusion of the plunger, reduces chain noise and component damage due to wear, and rapidly re-establishes proper tension on engine start-up.

Components in FIG. 5 which correspond to components in FIGS. 1–4 are denoted by reference numbers which exceed the reference numbers in FIGS. 1–4 by 100.

The tensioner housing 220 has three oil reservoirs 222a, 222b, and 222c, which gradually receive oil fed under pressure from an external oil pressure source (not shown), and supply the oil to a high-pressure oil chamber (not shown) inside the plunger 210. Throttle holes 224a and 224b, in partition walls 225a and 225b, provide fluid communication between oil reservoirs 222a and 222b, and between oil reservoirs 222b and 222c.

The tensioner 200 provides a further improvement in controlling the flow of oil to the high pressure chamber of the tensioner because it has three reservoirs rather than two, and two throttle holes rather than one. This embodiment provides further assurance against the supply of excessive oil to the high-pressure oil chamber of the tensioner.

Figure 6:
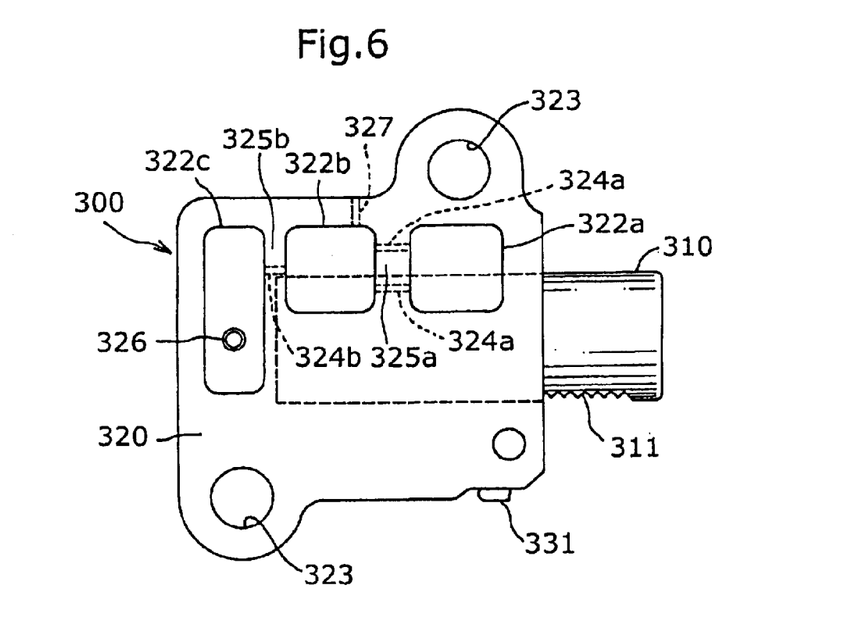
FIG. 6 is a schematic view of a ratchet-type hydraulic tensioner according to a third embodiment of the invention.

In another alternative embodiment shown in FIG. 6, a tensioner 300 includes a retractable plunger 310, slidably fitting into a housing 320, and spring-biased so that it protrudes from the housing toward a traveling timing chain (not shown). Components in FIG. 6 which correspond to components in FIG. 5 are denoted by reference numbers which exceed the reference numbers in FIG. 5 by 100.

The tensioner 300 is similar to the tensioner 200 in FIG. 5, and has three oil reservoirs 322a, 322b, and 322c, which gradually receive oil fed under pressure from an external oil pressure source (not shown), and supply the oil to a high-pressure oil chamber (not shown) inside the plunger 310. In this embodiment, there are two throttle holes 324a, extending through partition wall 325a, and providing fluid communication between reservoirs 322a and 322b. A single throttle hole 324b is provided in partition wall 325b to provide fluid communication between oil reservoirs 322b and 322c.

In tensioner 300, the number of throttle holes between successive reservoirs decreases in the direction of flow of oil toward the high pressure oil chamber of the tensioner, thereby improving the control of the flow of oil into the high pressure chamber and avoiding the supply of excess oil to the high-pressure oil chamber.

The tensioner according to the invention exhibits several unique effects. The plural reservoirs, which communicate with one another through throttle valves, gradually receive supply oil fed under pressure from the external oil pressure source, and supply the oil to the hydraulic valve mechanism without delivering the oil rapidly and under high pressure to the oil chamber side of the plunger. The tensioner structure therefore suppresses the flow of excess oil to the plunger without the need for attachment of other components to the tensioner for controlling the flow of oil. The tensioner prevents abnormal protrusion of the plunger, reduces the whistling sound, maintains smooth travel of the chain, and reduces damage to tensioner components due to wear.

The tensioner according to the invention also prevents air from becoming mixed with oil in the high-pressure oil chamber when the engine and oil pump stop simultaneously, and thereby ensures that proper chain tension is established rapidly following engine start-up.

When the tensioner having plural reservoirs communicating through one or more throttle holes is also provided with an oil discharge hole for, discharges excess oil from one of the reservoirs to the outside of the tensioner housing, is provided in the oil reservoir, part of the excess oil, and also oil mixed with air, if present, are discharged to the outside of the tensioner housing. When the oil discharge hole is provided, the entry of excess oil into the high-pressure oil chamber, and mixing of air with the oil, can be avoided substantially completely. Accordingly, whistling sounds generated at engine start-up can be avoided, and further improvements in the establishment of proper chain tension and reduction of wear damage to the tensioner and associated components can be realized.

We claim:

1. A ratchet-type hydraulic tensioner comprising:

a housing having a plunger-receiving hole;

a plunger slidably fitting into said plunger-receiving hole and protruding therefrom, said plunger and said housing together forming an oil chamber;

a spring biasing said plunger in the protruding direction;

a ratchet locking mechanism comprising a pawl pivoted on said housing, and ratchet teeth on said plunger engaged by said pawl; and a hydraulic valve mechanism, allowing oil from an external source to flow under pressure into said oil chamber, but blocking reverse flow of oil out of said oil chamber;

wherein the improvement comprises:

an opening formed in said housing for receiving oil from said external source;

a plurality of oil reservoirs formed in said housing, said oil reservoirs being arranged in a series of successive reservoirs, the reservoirs of each successive pair of reservoirs being separated by a partition formed in said housing;

at least one throttle hole formed in, and extending through, each said partition for controlling flow of oil from the reservoir on one side thereof to the reservoir on the other side thereof; and a passage formed in said housing, leading from a final reservoir in said series of successive reservoirs to said hydraulic valve mechanism;

said series of reservoirs, each said throttle hole, and said passage, together providing a flow path, located entirely within said housing, leading from said opening for receiving oil from said external source to said hydraulic valve mechanism;

whereby said reservoirs can gradually receive oil fed under pressure from an external source and supply the oil to said oil chamber through said hydraulic valve mechanism.

2. A ratchet-type hydraulic tensioner according to claim 1, having a discharge hole leading from one of said reservoirs to the exterior of the housing, for discharging excess oil.

* * * * *